United States Patent

Bernin

[15] 3,698,531

[45] Oct. 17, 1972

[54] SOLID STATE SWITCH

[72] Inventor: Victor M. Bernin, Mt. Prospect, Ill.

[73] Assignee: Illinois Tool Works, Inc., Chicago, Ill.

[22] Filed: Oct. 26, 1970

[21] Appl. No.: 85,182

[52] U.S. Cl. .................197/98, 235/145 R, 335/205, 336/110, 340/174, 340/347

[51] Int. Cl. ...............................................B41j 5/08

[58] Field of Search .197/98; 235/145, 146; 336/110; 335/205, 206, 207; 340/172.5, 174, 347

[56] References Cited

UNITED STATES PATENTS

| | | | |
|---|---|---|---|
| 2,814,031 | 11/1957 | Davis | 235/145 R |
| 2,997,703 | 8/1961 | Powell | 340/347 |
| 3,129,418 | 4/1964 | De La Tour | 197/98 UX |
| 3,160,875 | 12/1964 | Bernard | 340/347 |
| 3,363,737 | 1/1968 | Wada et al. | 197/98 |
| 3,403,386 | 9/1968 | Perkins et al. | 340/172.5 |
| 3,488,613 | 1/1970 | Marchetti | 197/98 UX |
| 3,495,236 | 2/1970 | Mathamel | 197/98 UX |
| 3,585,297 | 6/1971 | Scuitto et al. | 197/98 X |

*Primary Examiner*—Ernest T. Wright, Jr.
*Attorney*—Robert W. Beart, Michael Kovac and Jack R. Halvorsen

[57] ABSTRACT

The disclosure describes a keyboard switch having two magnetic cores and a plurality of permanent magnets. The permanent magnets are mounted on a keystem and are movable with respect to the cores to change the flux density in the cores and thus vary the coupling between an AC drive winding and one or more secondary output windings threading each core. Non-magnetic regions separate the permanent magnets and these regions are positioned such that flux changes in one core, resulting from movement of the keystem, are out of phase with the flux changes in the second core. The output signal from one core may be used to strobe or sample the output signals appearing on the secondary windings of the other core. When a plurality of the switches are incorporated in a keyboard, the switches possess an inherent "roll-over" capability. The disclosure also describes a keyboard circuit employing a plurality of the switches.

14 Claims, 7 Drawing Figures

INVENTOR
VICTOR M. BERNIN

BY Griffin Branigan and Kindness
ATTORNEYS

INVENTOR
VICTOR M. BERNIN

BY Griffin Branigan and Kindness
ATTORNEYS

SOLID STATE SWITCH

PRIOR ART

Manually operated keyboards comprise a well known means for entering information into data processors. One of the problems encountered in such devices is that of "roll-over." Roll-over is the tendency of a particularly fast operator to depress a second key before a previously depressed key is released. A certain degree of roll-over is desirable because it permits increased typing speeds. However, if roll-over is excessive, it results in a "double strike." That is, the keyboard will emit signals which are a combination of the signals which each of the two keys would emit if depressed individually.

A further problem is that of timing the transfer of keyboard generated signals into the data processor.

In prior art keyboards of the type employing electrical contacts mechanically closed by depression of a key, the problem of roll-over was overcome by employing mechanical interlocks. These interlocks permitted one key to be partially depressed before another key was released, but would not permit two keys to be depressed far enough so that the contacts associated therewith were closed at the same time. In this type of keyboard, the problem of transfer timing was solved by providing an additional set of contacts. This set of contacts would not close until after the data-representing contacts were fully closed. The signal produced by the additional set of contacts was then used to strobe a set of gates which gated the data-representing signals from the keyboard into the processor.

Keyboards employing electrical switch contacts require considerable maintenance. The electrical contacts arc or oxidize and dirt entering the keyboards tends to foul the contacts. To overcome these problems, solid state switches have been developed which have no electrical contacts. One type of solid state switch employs a magnetic core and one or more permanent magnets for selectively saturating or unsaturating the core as the key is depressed. While solid state switches overcome the maintenance problems associated with contact type switches, they require elaborate and expensive circuits for generating the strobe signal. Furthermore, the degree of roll-over which will not cause a double strike is extremely limited.

SUMMARY OF THE INVENTION

An object of the present invention is to provide a solid state keyboard, the switches in said keyboard being designed to provide a greater degree of roll-over without causing a double strike.

An of this invention is to provide a solid state keyboard switch having an inherent roll-over capability.

Another object of this invention is to provide a solid state key switch having means associated therewith for producing a strobe signal subsequent to the time it produces data signals.

A further object of this invention is to provide a keyboard switch comprising a data core, a strobe core, and a plurality of permanent magnets separated from each other by non-magnetic regions and mounted on a keystem for movement relative to the cores, said permanent magnets being positioned to saturate both said cores when the key is at rest or when fully depressed, and said non-magnetic regions being positioned so as to permit first said data core and then said strobe core to desaturate as the key is moved from the rest position to the fully depressed position.

In accordance with the principles of the present invention, a plurality of key switches as described above may be mounted in a keyboard and an AC signal applied to a primary drive winding associated with each core. Each data core is provided with secondary or output windings that are inductively coupled to the primary winding when the core is unsaturated. Each strobe core has a single secondary winding that is inductively coupled to the primary winding when the strobe core is unsaturated. The signal on the strobe core secondary winding is rectified, filtered and applied to a level detector which triggers a pulse generator, thereby producing a strobe pulse for gating data from the switches into a processor.

DESCRIPTION OF PREFERRED EMBODIMENT

Figures 1, 2A, 2B, 2C, 2D:
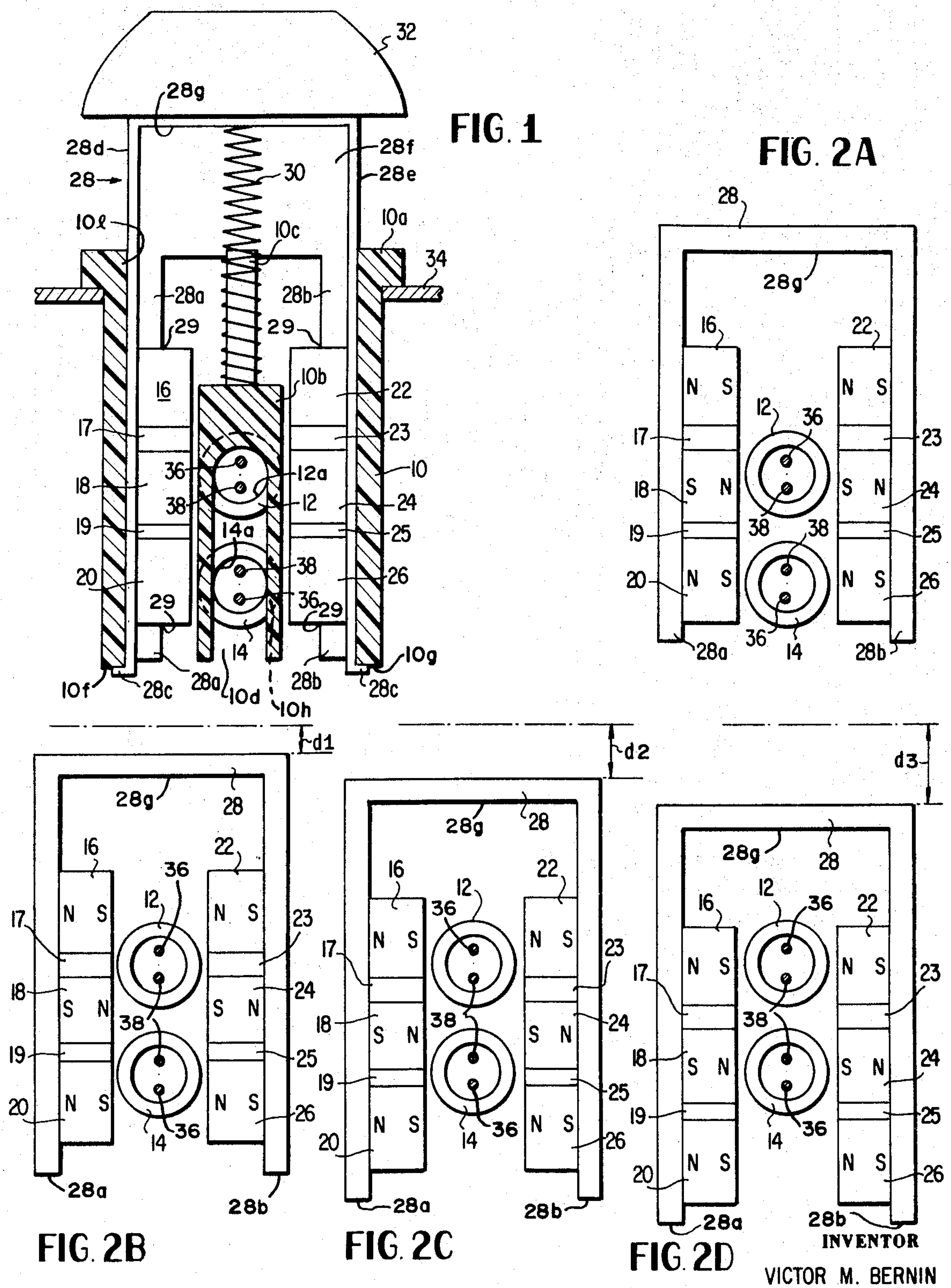
FIG. 1 is a front view, partly in section, of a solid state switch.
FIGS. 2A—2D are schematic diagrams illustrating the operation of a switch constructed according to the present invention.

FIG. 1 illustrates a preferred embodiment of a switch constructed in accordance with the present invention. The switch comprises a housing or guide support means 10, first and second magnetic cores 12 and 14, a first plurality of permanent magnets 16, 18, and 20, a second plurality of permanent magnets 22, 24, and 26, a keystem 28, and a keystem return spring 30. A keycap 32 is attached to the top 28*g* of the keystem 28.

The housing 10 is an elongated body which may be square and need be no wider than the dimensions of the keycap 32. The housing 10 may be formed of plastic or other non-magnetic material and, in the disclosed embodiment, comprises an integral body formed from a single piece of polycarbonate. The housing 10 may be formed with overhanging ledge portions 10*a* extending at least partially around its top for supporting the switch in a keyboard support plate 34.

The housing 10 has a longitudinal opening 10*e* for receiving the keystem 28 which, as shown in FIG. 1, is a generally box-like structure having three sides 28*d*, 28*e*, 28*f* and a top 28*g*. As viewed in FIG. 1, a portion of the backside 28*f* of the keystem 28 is cut away so as to form two downwardly extending legs 28*a* and 28*b*. A central portion 10*b* of the housing 10 extends from the front side to the back side of the housing 10 thus bisecting the lower portion of the longitudinal opening 10*e* extending through the housing 10. A post 10*c* extends upwardly from central portion 10*b* to retain compression spring 30 which is compressed between portion 10*b* of the housing 10 and the underside of the top portion 28*g* of the keystem 28.

The keystem 28 has a portion of one side 28*f* removed so that legs 28*a* and 28*b* may straddle the central portion 10*b* of the housing 10. The sides 28*d* and 28*e* of the keystem 28 are formed with two downwardly extending ears 28*c*. After the keystem 28 is inserted through the opening 10*e* in housing 10, the ears 28*c* are bent outwardly. When so bent, the ears 28*c* engage the lower edges 10*f* and 10*g* of the housing 10 and limit upward movement of the keystem 28 in response to the bias exerted on the keystem 28 by the compression spring 30. The central portion 10*b* of the housing 10 has a recess 10*d* extending completely through the housing 10 from the front to the back thereof, as viewed in FIG. 1. A further recess 10*h* is formed perpendicular to recess 10*d* and extending from side to side through the central portion 10*b* of the housing 10 as viewed in FIG. 1. Ferrite toroidal cores 12 and 14 are positioned in the further recess 10*h* so that their center openings 12*a* and 14*a* are aligned with recess 10*d*. This arrangement locates the cores 12 and 14 so that they may be readily threaded by a primary winding 36 and one or more secondary windings 38. The cores 12 and 14 may be force fit into the recess 10*h* or else held in place by suitable adhesive materials. The cores 12 and 14 may be made from ferrite or other material exhibiting low magnetic remanence properties.

Although not illustrated in the drawing, the legs 28*a* and 28*b* of the keystem 28 may be punched and bent inwardly to form four tangs at 29 which engage appropriate recesses in the permanent magnets 16, 18, 20, 22, 24 and 26 to hold the permanent magnets 16, 18, 20, 22, 24 and 26 for movement with the keystem 28. By way of example only, the keystem 28 may be formed of nickel plated steel and the permanent magnets 16, 18, 20, 22, 24 and 26 from a barium ferrite filled compound.

Each permanent magnet 16, 18, 20, 22, 24 and 26 is separated from the adjacent magnet 16, 18, 20, 22, 24 and 26 by a non-magnetic region 17, 19, 23 and 25. Thus, magnets 16 and 18 are separated by non-magnetic region 17, magnets 18 and 20 are separated by non-magnetic region 19, magnets 22 and 24 are separated by non-magnetic region 23, and magnets 24 and 26 are separated by non-magnetic region 25. As shown schematically in FIG. 2A, the magnets 16, 18, 20, 22, 24 and 26 are attached to legs 28*a* and 28*b* of the keystem 28 with the north poles of magnets 16 and 20 and the south pole of magnet 18 facing leg 28*a*. The south poles of magnets 22 and 26 and the north pole of magnet 24, face leg 28*b*. Preferably, the outer diameters of cores 12 and 14 are slightly less than the width of the central portion 10*b* of the housing 10 so that the permanent magnets 16, 18, 20, 22, 24 and 26 do not touch the cores 12 and 14 as they slide along the sides of the central portion 10*b* of the housing 10.

Figure 3:
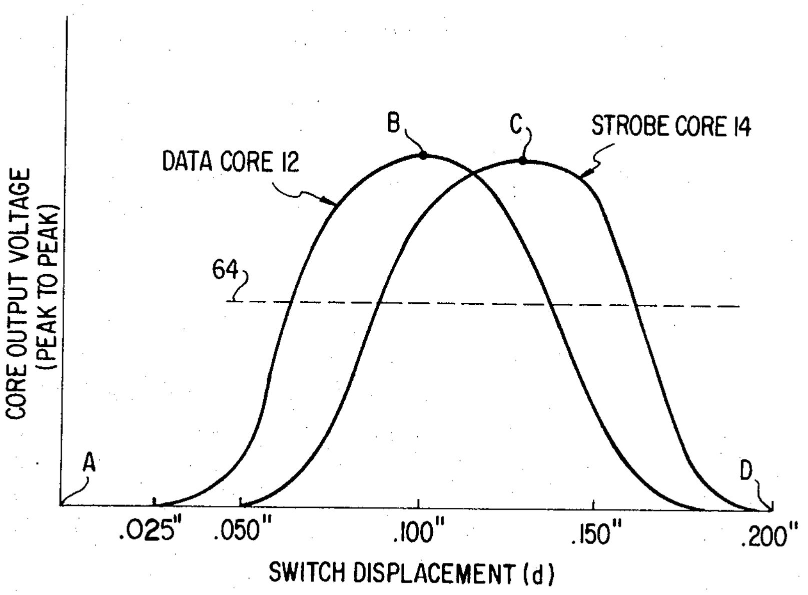
FIG. 3 is a plot of the transfer characteristics of the data and strobe cores; and, FIG. 4 is a circuit diagram showing a plurality of keyboard switches wired to produce data output signals and a strobe signal for selectively gating the data output signals.

FIG. 3 is a plot of the transfer characteristics of the cores 12 and 14. Assuming an AC voltage is applied to the drive windings 36 of cores 12 and 14, FIG. 3 shows the peak-to-peak AC voltage which is induced on the secondary windings 38 of the cores 12 and 14 as the keystem 28 is depressed and released. The points A, B, C, and D on the curve of FIG. 3 correspond to the various keystem 28 positions shown in FIGS. 2A through 2D. The position in FIG. 2A corresponds to point A, and the positions *d*1, *d*2 and *d*3 of FIGS. 2B, 2C and 2D respectively correspond to points B, C and D respectively.

An important aspect of the present invention is the fact that the transfer characteristic of core 14 is out of phase with that of core 12. This is evident from FIG. 3 which shows that as the keystem 28 is depressed, the output of core 14 begins to rise after the output of core 12, reaches its peak value after the output of core 12 reaches its peak, and returns to zero after the output of core 12 has returned to zero. Conversely, as the depressed keystem 28 is released, the output of core 14 rises before that of core 12, reaches its peak before that of core 12, and returns to zero before the output of core 12 returns to zero. This difference in transfer characteristics is determined by the size and/or positioning of non-magnetic regions 17, 23, 19, and 25, as will become evident from the following description.

FIG. 2A schematically represents the position of the permanent magnets 16, 18, 20, 22, 24 and 26 relative to cores 12 and 14 when the keystem 28 is in its normal or undepressed state. The permanent magnets 20 and 26 are directly opposite core 14, and the permanent magnets 18 and 24 are substantially opposite core 12, but not directly opposite the core 12. The non-magnetic regions 19 and 25 are located above core 14, whereas non-magnetic regions 17 and 23 are located opposite the uppermost limits of core 12. Thus, the lowermost extremities of the non-magnetic regions 17 and 23 are located closer to the horizontal axis of core 12 than the lowermost extremities of non-magnetic regions 19 and 25 are to the horizontal axis of core 14.

With the magnets 16, 18, 20, 22, 24 and 26 being poled as indicated in FIG. 2A, a flux path is established from the north pole of magnet 20, through keystem leg 28*a*, through magnet 18, through parallel paths in core 12, through magnet 24, through keystem leg 28*b*, through magnet 26, and through parallel paths in core 14 back to magnet 20. A secondary flux path extends directly from leg 28*a* through the upper portion 28*g* of the keystem 28 to leg 28*b*. Since the flux takes the path of least resistance, flux in the gap between magnets 20 and 26 is concentrated in core 14 and flux in the gap between magnets 18 and 24 is concentrated in core 12 thereby saturating the cores 12 and 14.

When either of the cores 12 or 14 is saturated, it will not act as a transformer hence an AC signal applied to primary windings 36 of the cores 12 and 14 will not induce signals in the secondary windings 38 when the keystem 28 is in its normal position. As indicated by point A in FIG. 3, the output voltage on the secondary winding 38 of both cores 12 and 14 is zero when switch displacement is zero.

As the keystem 28 is depressed, it moves all the permanent magnets 16, 18, 20, 22, 24 26 and the non-magnetic regions 17, 19, 23 and 25 downwardly with respect to the stationary cores 12 and 14. The first increments of movement cause no change in the output voltage on the secondary windings 38 because the permanent magnets 18, 24, 20 and 26 are still sufficiently close to cores 12 and 14 to cause saturation. However, upon sufficient downward movement of the keystem 28 (illustrated in FIG. 3 as 0.025) the non-magnetic regions 17 and 23 begin to have an effect on the flux concentration in core 12. The reason is that the non-magnetic regions 17 and 23 move into the spaces closer to core 12 formerly occupied by magnets 18 and 24, thereby increasing the reluctance of the flux path through core 12. As the reluctance of the flux path through the core 12 increases, there is a decrease in magnetic flux so that the core 12 becomes less saturated and begins to function as a transformer. Thus, an AC drive signal applied to the drive winding 36 of core 12 causes a small AC signal to appear on secondary winding 38.

Since non-magnetic regions 19 and 25 were initially further from the horizontal axis of core 14 than the non-magnetic regions 17 and 23 were from the horizontal axis of core 12, the regions 19 and 25 are not sufficiently close to the horizontal axis of core 14 to affect its saturation at the time core 12 begins to desaturate. Thus, there is no output signal on the secondary winding 38 of core 14 at this time. However, upon further depression of the keystem 28, the non-magnetic regions 19 and 25 move sufficiently close to the horizontal axis of core 14 to have an effect on the flux concentration in the core 14. The magnetization of the core 14 drops below the saturation level and, as illustrated in FIG. 3, the core 14 begins producing an AC signal of small amplitude on its secondary winding 38 when the keystem 28 has been depressed about 0.050 inches.

The magnetization of the cores 12 and 14 drops further below the saturation level as the keystem 28 is further depressed, until the keystem 28 reaches the position shown in FIG. 2B. At this time, the non-magnetic regions 17 and 23 are aligned with the horizontal axis of core 12 and exert their greatest influence on the magnetic flux path through the core 12. The core 12 is in its condition of least magnetization and provides the greatest coupling between its primary drive winding 36 and its secondary output winding 38. This condition is represented by point B in FIG. 3 which indicates that the peak-to-peak voltage on the secondary winding 38 is at its maximum value.

As shown in FIG. 2B, the non-magnetic regions 19 and 25 have not yet reached a position of alignment with the horizontal axis of core 14. Thus, although core 14 is partially desaturated it has not reached its condition of least magnetization and thus the output voltage on its secondary winding 38 has not reached a maximum value. At this time, there is a flux path extending from magnet 20 through the keystem 28 to magnet 26, and from magnet 26 through parallel paths in core 14 back to magnet 20.

As the keystem 28 is further depressed below the position shown in FIG. 2B, the non-magnetic regions 19 and 25 move into a position of alignment with the horizontal axis of core 14 as shown in FIG. 2C and the flux through the core 14 reaches its minimum value. This in turn permits greater coupling between the primary 36 and secondary 38 windings in the core 14, and the output voltage of the core 14 reaches its peak value as indicated by point C in FIG. 3.

Meanwhile, as the keystem 28 is further depressed below the position shown in FIG. 2B, the non-magnetic areas 17 and 23 begin to move below or away from core 12 and the spaces they occupied are occupied by magnets 16 and 22. Thus, the reluctance of the flux path through core 12 begins to decrease and more flux is concentrated in the core 12. The flux path at this time extends from magnet 16 through keystem 28 through magnet 22, and through parallel paths in core 12 back to magnet 16. As shown in FIG. 3, the output voltage on the secondary winding 38 of core 12 has decreased to about three-fourths of its maximum value when the keystem 28 reaches the position shown in FIG. 2C.

The flux concentration in both cores 12 and 14 increases as the keystem 28 moves from the position shown in FIG. 2C to the position shown in FIG. 2D. This causes decreases in the output voltages on both secondary windings 38. Because of the positioning of the permanent magnets 16, 18, 22 and 24 and non-magnetic regions 17 and 23, the output voltage on the secondary winding 38 of core 12 drops to zero first. Further slight movement of the keystem 28 results in voltage on the secondary winding 38 of core 14 dropping to zero. This occurs just before the keystem 28 reaches its lower limit of travel as shown in FIG. 2D.

Two flux paths exist in FIG. 2D. One extends from magnet 16 through leg 28*a*, magnet 18, parallel paths through core 14, magnet 24, leg 28*b*, magnet 22, and through parallel paths in core 12 back to magnet 16. A second path extends from magnet 16 through the upper portion 28*g* of the keystem 28 to the magnet 22.

The operation of the switch, when it is released, is just the reverse of its operation when depressed. When the keystem 28 is released, the key return spring 30 drives the keystem 28 from the position shown in FIG. 2D back to the position shown in FIG. 2A. However, it should be noted that during key return, the output from core 14 reaches its maximum value before the output of core 12 reaches its maximum value and then returns to zero before the output of core 12 returns to zero.

Figure 4:
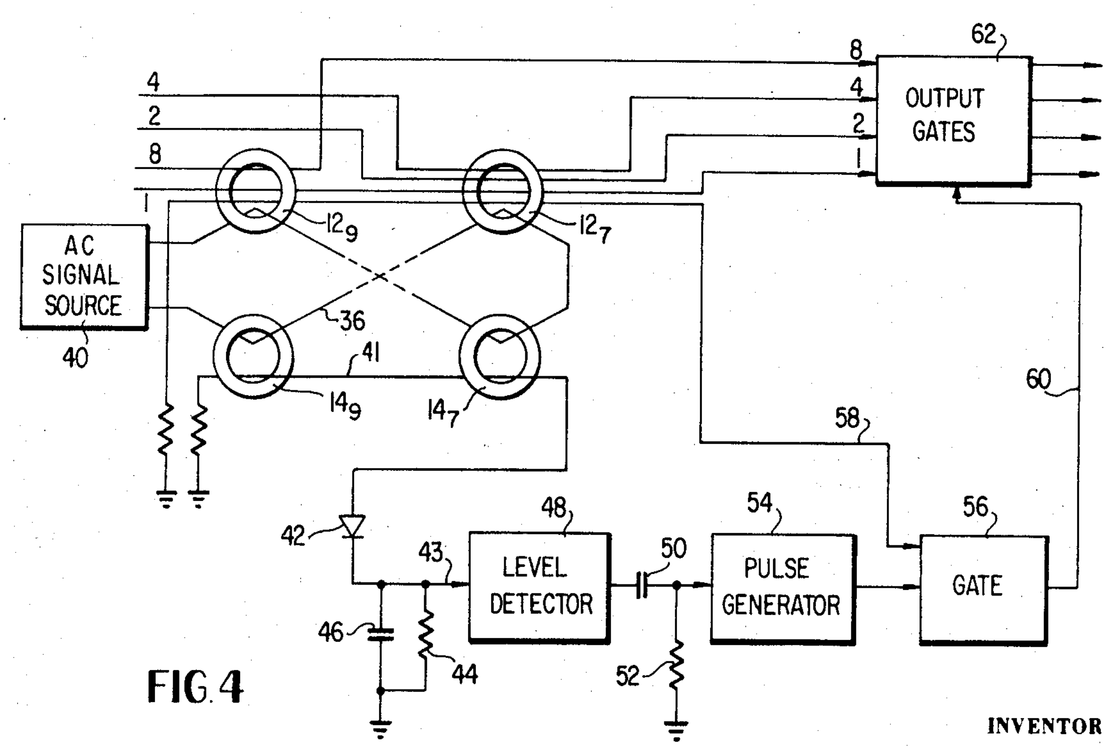

FIG. 4 illustrates how a plurality of key switches like that shown in FIG. 1 may be incorporated into a complete keyboard circuit. For the sake of simplicity, only the cores $12_7$, $12_9$, and $14_7$, $14_9$ for two keys, the 7 and 9 keys of a binary coded decimal keyboard, are shown. However, it will be obvious that the decimal or other codes may be employed depending upon the intended use of the keyboard.

An AC signal source 40 is connected to a primary drive winding 36 that threads the strobe cores $14_9$ and $14_7$ and the data cores $12_9$ and $12_7$. A single secondary winding 41 threads each of the strobe cores $14_9$ and $14_7$. The secondary winding 41 is connected through a diode 42 to a filter comprising a resistor 44 and a capacitor 46. The diode 42 and filter 44 and 46 act as an AC to DC converter. The output of the filter 44 and 46 is connected to the input 43 of a level detector 48 which may, for example, be a Schmitt trigger. The output of the level detector 48 is connected through a differentiator circuit comprising a capacitor 50 and a resistor 52. The output of the differentiator circuit 50 and 52 is applied as the input to a pulse generator 54. The pulse generator 54 may, for example, comprise a monostable multivibrator. The output of the pulse generator 54 is connected as one input of a two input gate 56. A secondary winding 58 threads each of the data cores $12_7$ and $12_9$ and is connected as a second input to the gate 56. The output of gate 56 is a strobe signal which is applied over a lead 60 to one input of a plurality of output gates 62.

There are four output gates 62, each having two input terminals. The first input terminal of each gate 62 is connected to the strobe output signal line 60. A plurality of secondary windings representing data bits 1, 2, 4, and 8 are selectively threaded through the data cores 12 of the keyboard and each of these secondary windings is connected as the second input to an individual one of the output gates 62. By way of example, the data core $12_9$ of the 9 key is threaded by the data lines representing the coded decimal bits 1 and 8 whereas the data core $12_7$ of the 7 key is threaded by the data lines representing the binary bits 1, 2 and 4.

The circuit shown in FIG. 4 will be explained with reference to FIG. 3. For ease of explanation, the reference level 64 in FIG. 3 is assumed to be the voltage level which triggers the level detector 48. Furthermore, it is assumed that line 64 represents the voltage level which will condition an input of the gates 56 and 62. As will be obvious from the following description, the voltage level which triggers the level detector 48 need not be, and in most cases would not be, exactly the same level that would condition the gates 56 and 62.

The AC signal source 40 continuously applies an AC signal to the primary winding 36. As long as no key is depressed, all data cores 12 and all strobe cores 14 are saturated and no output signals appear on any of the secondary windings of the cores 12 and 14.

Assume that the operator depresses the 9 key. As the key is depressed, first the data core $12_9$ and then the strobe core $14_9$ begins to desaturate. As shown in FIG. 3, the peak-to-peak magnitude of the AC voltage on the secondary winding 58 threading core $12_9$ begins to increase and reaches the reference level 64 while the magnitude of the voltage induced on the secondary winding 41 of strobe core $14_9$ is still quite small. Even though the signal of lead 58 exceeds the reference level 64, the gate 56 blocks the signal because there is no output from the pulse generator 54 at this time. Furthermore, since the gate 56 is blocked, there is no output on the lead 60 to condition the gates 62, hence, the AC voltages on data lines 1 and 8 are prevented from passing through the output gates 62.

As the 9 key is further depressed, the flux in strobe core $14_9$ decreases to the point where the AC signal induced in secondary winding 41 exceeds the reference level 64 required to trigger the level detector 48. The AC signal on secondary winding 41 is continuously rectified by diode 42 and smoothed by the filter 44, 46 before being applied as a DC signal to the Schmitt trigger level detector 48. When the 9 key is depressed far enough to cause the AC signal on secondary winding 41 to exceed the reference level 64, the input signal to the Schmitt trigger level detector 48 fires the Schmitt trigger 48 and its output voltage rises. The leading edge of the positive-going output signal from the level detector 48 is differentiated and applied to pulse generator 54 thereby triggering the pulse generator 54. The pulse generator 54 is adjusted to produce an output pulse of predetermined duration extending over at least one and preferably over several cycles of the AC signal source 40.

The output pulse from pulse generator 54 conditions one input of gate 56. As shown in FIG. 3, the AC signal on secondary winding 58 of core $12_9$ is near its maximum value at this time and is well above the reference level 64. Therefore, once each cycle of this signal on secondary winding 58 the gate 56 is conditioned and produces a strobe pulse on lead 60. These strobe pulses condition the second inputs to the gates 62 receiving the one bit and eight bit data signals and thus pulses representing the one bit and eight bit are passed through the output gates 62 from whence they may be fed to a data processing device.

After a predetermined interval of time as determined by the setting of the multivibrator in the pulse generator 54, the output pulse from the pulse generator 54 terminates and blocks gate 56. With no output signal from the gate 56, the gates 62 are also blocked.

As the 9 key is further depressed, the magnitude of the AC signals on the one bit and eight bit lines decreases to zero. The same is true of the AC signals being induced on secondary windings 41 and 58. When the AC signal on secondary winding 41 drops below the reference level 64, the Schmitt trigger in the level detector 48 returns to its initial state and the output of the level detector 48 drops to zero. The leading edge of the negative-going signal is differentiated and applied to the pulse generator 54 but the design of the pulse generator 54 is such that it does not respond to negative pulses. Therefore, the gate 56 and the output gates 62 remain blocked.

As the operator releases the 9 key, the strobe core $14_9$ begins to desaturate before the data core $12_9$. As the magnetization of core $14_9$ decreases, an AC signal of increasing magnitude is again induced on the winding 41. This signal is rectified and filtered and applied to the level detector 48. When the 9 key has been released sufficiently for the AC signal to exceed the reference level 64, the level detector 48 is triggered and produces another positive output of predetermined duration to condition one input gate 56. However, at the time the AC signal on secondary winding 41 exceeds the reference level 64, data core $12_9$ is still almost completely saturated and the magnitude of the AC signal on its secondary winding 58 is considerably less than that required to condition the second input of gate 56. Therefore, the gate 56 does not produce a strobe output pulse to condition gates 62.

As the 9 key travels further upward during its return stroke, the magnitude of the AC signal on secondary windings 58 increases and exceeds the reference level 64. However, by this time, the pulse from pulse generator 54 has terminated so that gate 56 remains blocked.

As the 9 key is released further, the strobe core $14_9$ again becomes saturated and the AC signal induced on secondary winding 41 again drops below the level required to trigger the level detector 48. The level detector 48 returns to its normal state and produces another negative going output signal. As before, this negative going signal is ignored by the pulse generator 54. Further release of the 9 key to its initial position causes no further action other than reducing the magnitude of the AC signals induced on all secondary windings 41 and 58 of the cores 12 and 14 to zero. This completes the keyboard operation for single depression of the key and the keyboard is now ready for another key to be depressed.

It is not necessary for one key to be completely released before the next key is depressed. As described above, the output gates 62 are strobed only once for each depression of a key. With reference to FIG. 3, this occurs when the output signal from the strobe core 14 reaches the reference level 64 as a key is depressed, and lasts only for the duration of the pulse produced by pulse generator 54. On the other hand, data representing signals are available to the output gates 62 during two intervals of each key stroke. One of these intervals occurs on the downward stroke of the key while the AC signals on the secondary windings 58 of the data core 12 exceed the reference level 64, and the other occurs during the key return stroke when the AC signals on the secondary windings 58 of the data core 12 exceed the reference level 64. Thus, two keys may be rolled provided the second key is not depressed far enough to cause the generation of a pulse by the pulse generator 54 until after the preceding key has been released far enough to allow the AC signal on the secondary windings 58 of the data core 12 for that key to drop below the reference level 64. With reference to the specific switch transfer characteristics shown in FIG. 3, this means that a second key can be depressed approximately 0.09 inches provided the first key has returned to within about 0.063 inches of its home position. Since total key travel is approximately 0.200 inches, this means that a second key may be depressed approximately 45 percent of its total travel before the precedingly depressed key has returned two-thirds of the way to its home position. This provides a wide margin for a fast keyboard operator to "roll" the keys.

From the foregoing description, it is seen that the present invention provides a simple, reliable, and inexpensive switch capable of producing both strobe and data signals while at the same time having an inherent roll over capability. While a specific preferred embodiment has been described in detail, it will be evident that various modifications and substitutions may be made in the described embodiment without departing from the spirit and scope of the invention as defined in the appended claims.

The embodiments of the invention in which an exclusive property or privilege is claimed are defined as follows:

1. A solid state keyboard switch comprising:

a data core and a strobe core;

primary and secondary windings threading each of said cores;

a plurality of magnets for selectively saturating said cores; and, means mounting said magnets for movement relative to said cores, said magnets being positioned relative to said cores to saturate said cores during overlapping intervals of time.

2. A solid state keyboard switch as claimed in claim 1 wherein:

said mounting means comprises a keystem of magnetic material having first and second legs for carrying said magnets in reciprocating movement.

3. A solid state keyboard switch as claimed in claim 2 wherein said plurality of magnets includes three pairs of magnets one magnet of each pair being mounted on said first leg of said keystem and the other magnet of each pair being mounted on said second leg.

4. A solid state keyboard switch as claimed in claim 3 wherein the magnets of said first pair are positioned to saturate said data core when said keystem is at one limit of its movement and saturate said strobe core when said keystem is at its other limit of travel, said magnets of said second pair saturating said data core when said keystem is at said other limit of travel, and said magnets of said third pair saturating said strobe core when said keystem is at said one limit of travel.

5. A solid state keyboard switch as claimed in claim 4 wherein said magnets are separated from each other by non-magnetic regions whereby said cores become unsaturated as said keystem moves from either of said limits of travel to the other.

6. A keyboard switch comprising:

first and second magnetic cores;

a depressable keystem of magnetic material having first and second legs extending on opposite sides of said cores;

a plurality of permanent magnets mounted on the legs of said keystem for movement immediately adjacent said cores to thereby selectively concentrate saturating flux in said cores;

a plurality of non-magnetic regions separating the permanent magnets on each leg;

said magnets and said non-magnetic regions being positioned relative to said cores whereby the flux concentration in one of said cores begins to decrease before the flux concentration in said other core begins to decrease as said keystem is depressed.

7. A keyboard switch as claimed in claim 6 wherein said magnets and said non-magnetic regions are positioned relative to said cores to saturate both said cores when said keystem is not depressed or when it is depressed to its full extent of travel.

8. A keyboard switch as claimed in claim 7 and further comprising:

a primary winding and at least one secondary winding threading each of said cores.

9. A keyboard switch as claimed in claim 8 wherein said cores are toroidal cores of a material having low magnetic remanence.

10. A keyboard comprising:

a plurality of key switches each including, a strobe core and a data core;

permanent magnet means mounted for movement on a keystem for saturating said cores when said keystem is either fully depressed or not depressed;

non-magnetic regions separating said permanent magnet means whereby first said data core and then said strobe core becomes unsaturated as said keystem is depressed;

a primary winding threading each of said cores;

secondary winding means threading each of said strobe cores;

data representing secondary winding means selectively threading said data cores in a coded pattern;

means for applying an AC signal to all said primary windings whereby AC signals are produced on said secondary winding means threading the cores of a key as the keystem is depressed; and, means responsive to the AC signals on the secondary winding means of said strobe cores for controlling the transfer of the AC signals on said secondary winding means of said data cores from said keyboard.

11. A keyboard as claimed in claim 10 wherein said means controlling the transfer of signals comprises:

AC to DC signal converter means connected to the secondary winding means of said strobe cores;

level detector means responsive to said converter means; and, pulse generator means responsive to said level detector means.

12. A keyboard as claimed in claim 11 and further comprising a further secondary winding means threading said data cores, and gating means responsive to said pulse generator means and said further secondary winding means for producing a strobe pulse controlling said transfer.

13. A keyboard as claimed in claim 11 wherein said level detector means comprises a Schmitt trigger.

14. A keyboard as claimed in claim 13 wherein said pulse generator means comprises a monostable multivibrator responsive to positive-going output signals from said trigger.

* * * * *